US011716745B1

(12) United States Patent
Mansour et al.

(10) Patent No.: US 11,716,745 B1
(45) Date of Patent: Aug. 1, 2023

(54) SCHEDULER SYSTEMS AND METHODS

(71) Applicant: T-Mobile Innovations LLC, Overland Park, KS (US)

(72) Inventors: Nagi A. Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 2 days.

(21) Appl. No.: 17/349,446

(22) Filed: Jun. 16, 2021

(51) Int. Cl.
*H04W 72/52* (2023.01)
*H04W 72/1268* (2023.01)

(52) U.S. Cl.
CPC ....... *H04W 72/52* (2023.01); *H04W 72/1268* (2013.01)

(58) Field of Classification Search
CPC .............. H04W 72/1252; H04W 72/1268
See application file for complete search history.

(56) References Cited

U.S. PATENT DOCUMENTS

| | | | | |
|---|---|---|---|---|
| 9,532,388 | B2* | 12/2016 | Panchal | H04L 1/0007 |
| 9,893,853 | B2* | 2/2018 | Yi | H04L 5/0053 |
| 10,045,151 | B1* | 8/2018 | Pawar | H04W 52/146 |
| 2010/0278082 | A1* | 11/2010 | Dahlman | H04W 72/0446 |
| | | | | 370/336 |
| 2014/0177492 | A1* | 6/2014 | Sun | H04L 5/14 |
| | | | | 370/280 |
| 2015/0071267 | A1* | 3/2015 | Wu | H04W 52/48 |
| | | | | 370/336 |
| 2015/0245246 | A1* | 8/2015 | Golitschek Edler von Elbwart ... | |
| | | | | H04L 5/001 |
| | | | | 370/280 |
| 2016/0021658 | A1* | 1/2016 | Chen | H04W 72/20 |
| | | | | 370/252 |
| 2016/0219627 | A1* | 7/2016 | Au | H04W 74/0841 |
| 2016/0262109 | A1* | 9/2016 | Chen | H04W 52/50 |
| 2016/0316490 | A1* | 10/2016 | Wang | H04W 76/10 |
| 2016/0337931 | A1* | 11/2016 | Wang | H04W 72/542 |
| 2017/0347340 | A1* | 11/2017 | Haley | H04L 27/2657 |
| 2018/0034736 | A1* | 2/2018 | Anchan | H04L 47/2433 |
| 2018/0063746 | A1* | 3/2018 | Anchan | H04W 36/0011 |
| 2018/0063747 | A1* | 3/2018 | Anchan | H04W 28/22 |
| 2019/0319751 | A1* | 10/2019 | Chen | H04L 1/1812 |
| 2019/0342042 | A1* | 11/2019 | Zhang | H04B 7/0623 |
| 2019/0364449 | A1* | 11/2019 | Yang | H04W 72/0446 |
| 2020/0229206 | A1* | 7/2020 | Badic | H04W 40/22 |
| 2020/0322811 | A1* | 10/2020 | Kang | H04W 56/001 |
| 2021/0029652 | A1* | 1/2021 | Li | H04W 52/365 |
| 2021/0219328 | A1* | 7/2021 | Xiong | H04L 5/0078 |
| 2021/0400761 | A1* | 12/2021 | Maleki | H04W 72/042 |

(Continued)

FOREIGN PATENT DOCUMENTS

WO  WO-2017011331 A1 * 1/2017 ......... H04L 61/6022

*Primary Examiner* — Nathan S Taylor
(74) *Attorney, Agent, or Firm* — Shook, Hardy & Bacon L.L.P.

(57) ABSTRACT

Methods and systems are provided for improving network communications, for example by scheduling or configuring a downlink/uplink (DL/UL) slot ratio, and/or an amount of redundant Transmission Time Intervals (TTIs) to be transmitted, in some cases prior to an acknowledgement. In embodiments using FDD, an improved scheduler can be asymmetrical, for example limiting resources used by an uplink to 20%, while allowing a user device to use a maximum power level, or an increased power level, in the uplink.

18 Claims, 8 Drawing Sheets

(56) References Cited

U.S. PATENT DOCUMENTS

2022/0123865 A1* 4/2022 Sridharan ............... H04L 1/189
2022/0182194 A1* 6/2022 Lorca Hernando .... H04J 11/005
2022/0386310 A1* 12/2022 Ibrahim .............. H04W 72/082

* cited by examiner

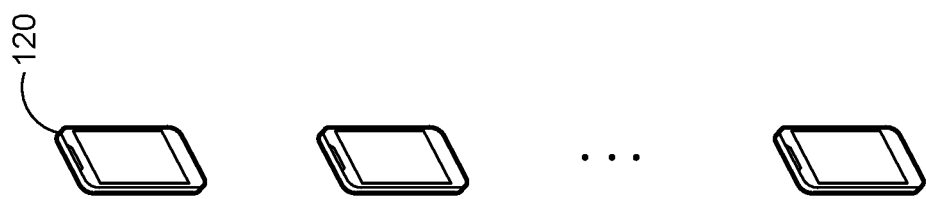
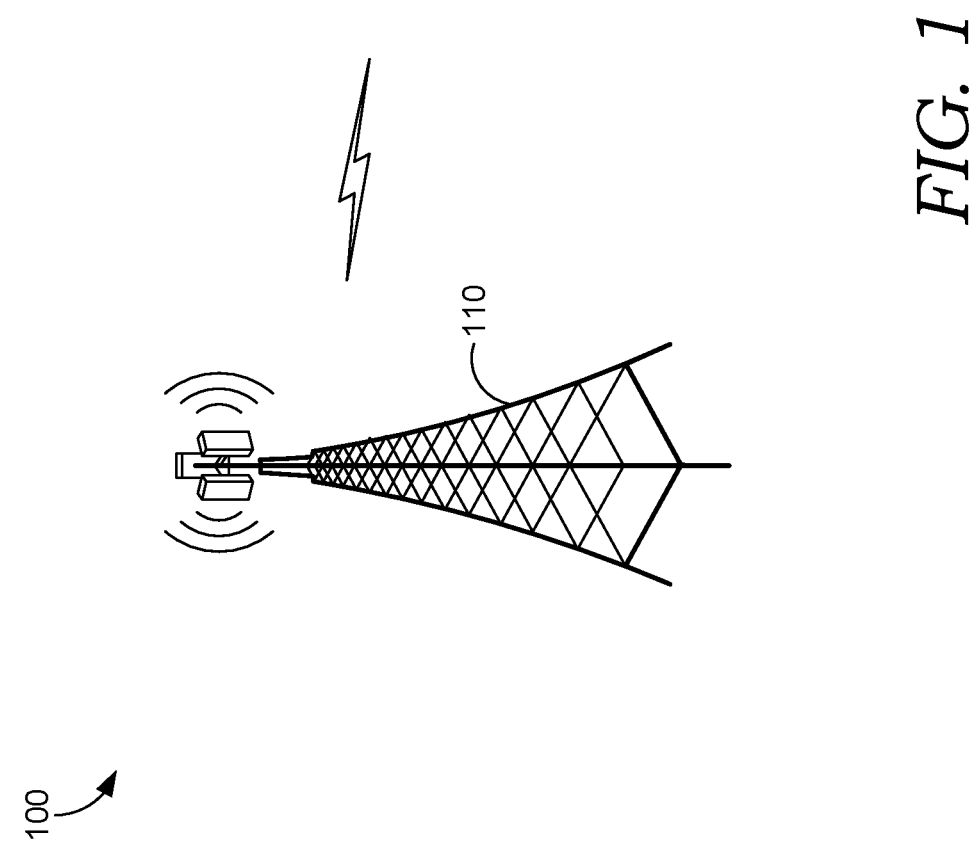
FIG. 1

SCHEDULER SYSTEMS AND METHODS

SUMMARY

In systems with one or more networks using radio frequencies, such as cellular networks using Time Division Duplexing (TDD) or Frequency Division Duplexing (FDD), aspects of the systems may cause the systems to perform sub-optimally, for example with respect to the quality of communications. For example, systems only implement one ratio of slot assignments in the context of TDD, or systems require a high level of redundancy of Transmission Time Intervals (TTIs) to be transmitted in TDD or FDD, and/or systems use symmetrical FDD implementations. Embodiments described herein enable improved network systems, in some cases including a scheduler component to improve aspects of the network systems, for example based on network traffic patterns or other usage data or predictions.

Embodiments described herein improve network communications, for example by scheduling or configuring a dynamic downlink/uplink (DL/UL) slot ratio when using TDD. In some embodiments, an analysis of the network or a portion of network traffic at various time and/or locations is used to automatically generate a schedule for use of more than one frame configuration, with more than one DL/UL slot ratio, in order to optimize communications in the network. In some cases, an amount of TTIs to be transmitted, in some cases prior to an acknowledgement, can be adjusted or dynamic, in order to achieve an improved level of redundancy, to improve qualities of the network, for example by eliminating unnecessary redundancy. When using FDD, an improved scheduler in accordance with embodiments can be asymmetrical, by limiting the resources used by an uplink, for example to 20% of the resources, while allowing a user device to use a maximum power level, or an increased power level, in the uplink. Embodiments include scheduler components, described below, which can improve a system by scheduling when the system utilizes certain DL/UL slot ratios, TTI redundancy, and/or asymmetric FDD.

In embodiments, scheduling resources in a network includes receiving traffic information associated with a location, for example a city or base-tower-coverage area, analyzing the traffic information to determine a first time period to be scheduled as using a first slot ratio, and transmitting first scheduling information indicating the first time period as using the first slot ratio. In some cases, the traffic information includes voice traffic about a threshold amount, such as a percentage of voice traffic with respect to the overall traffic. Scheduling information can include an amount of redundant TTIs to be used, in some cases, and the scheduling information can configure TDD and/or FDD parameters on an hourly basis or using other time intervals, or they can be configured until a next schedule is received, in some cases. In embodiments, a system can analyze traffic information to determine a second time period to be scheduled as using a second slot ratio, and transmitting the scheduling information can include indicating the second time period as using the second slot ratio, for example, a 3:2 or a 4:1 DL/UL slot ratio, as described herein. In some cases, the second time period is associated with one or more data transfer actions, such as organizations performing data dumps or other transfers or synchronization activities, which can cause the percentage of voice traffic to data traffic to be lower than normal or below a threshold. In embodiments, the location is a coverage area of a base tower, or the location can be a city or area code.

In some examples, a system for improving network performance is implemented, including identifying a first window of activity on a network, associating the first window of activity with a first network performance issue, and scheduling an uplink configuration for a second window of activity on the network, where the first window has at least one characteristic in common with the second window, such as a time of day. An uplink configuration can include a limit on resources associated with an uplink channel, and/or an uplink configuration can enable an increased power availability for one or more user devices. In some examples, the characteristic is a ratio of residential to commercial users, for example in an area. For instance, a city block or tower coverage area can be determined to include a high percentage of commercial users during certain hours, or other users, that may perform scheduled data transactions at certain off-times for voice or other traffic. In some cases, the first and second windows of activity are within a geographic boundary, and the first window of activity is historical activity on the network. In other cases, the first window of activity is associated with a first location and the second window of activity is associated with a second location. For example, Baltimore, Maryland could be analyzed, or a portion of Baltimore with a certain estimated ratio of personal to business network usage could be analyzed, in order to predict network traffic conditions in Boston, Massachusetts, or another area with one or more features in common. Models or machine-learning techniques can be used to predict aspects of network traffic for purposes of implementing an improved scheduler as described herein.

Embodiments include computer-readable media performing methods for scheduling, including analyzing a first type of network usage, determining that the first type of network usage is above a first level during a first time block, and establishing a schedule for a first DL/UL ratio based on the first type of network usage above the first level during the first time block. In some examples, the first DL/UL ratio is a 3:2 ratio, and/or the first level is an average level. The first type of network usage is voice traffic, in embodiments. This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 1 depicts an aspect of an example network environment suitable for use in implementations of the present disclosure;

DETAILED DESCRIPTION

Figure 2:
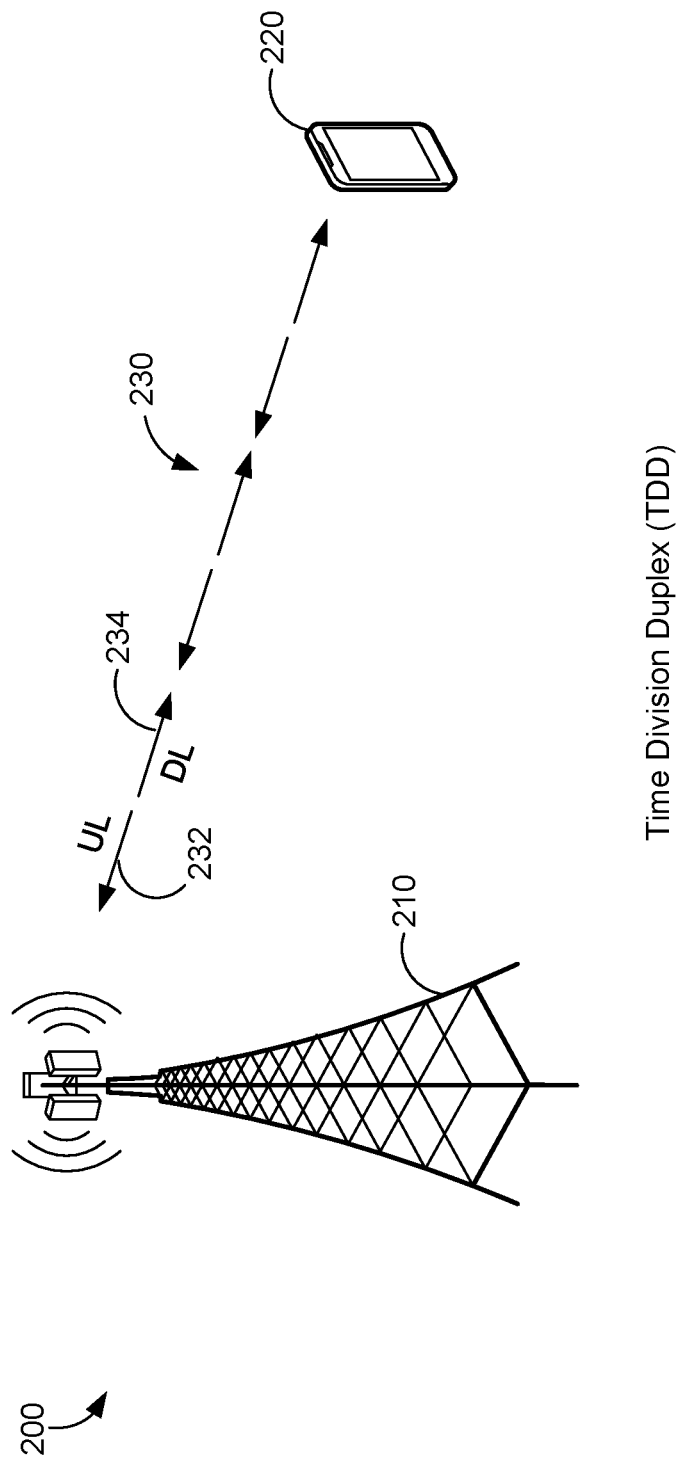
FIG. 2 depicts an aspect of an example network environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A system can include one or more aspects of a network environment, such as the exemplary environment 100 in FIG. 1, for example. Systems can use information about the network, such as traffic data or other demands or failures relating to user devices, such as a user device 120 discussed with respect to FIG. 1, below. In embodiments, traffic data or other data about performance of a network, such as the quality of voice or data communications, can be used by the system to generate improved scheduling components as described herein. For example, in the context of TDD, a scheduler component optimizes the scheduling of more than one DL/UL ratio based on network voice and/or data traffic, for example based on locations and time periods. A frame configuration comprising a 3:2 DL/UL split can be implemented for times and/or locations with likely predominantly voice traffic. A frame configuration comprising a 4:1 DL/UL split can be used for times and/or locations with likely predominantly data uses.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently. By way of background, conventional telecommunications networks comprise network operators (i.e., wireless service providers, wireless carriers, network carriers, etc.) for delivering wireless communication services.

The practice of TTI bundling can cause the transmission of the same packets up to four times in one scheduling period, for example to increase uplink transmission reliability. In embodiments, a schedule of how many redundant TTIs to transmit can be implemented, such as zero, one, two, or three copies of TTIs, in some cases before an acknowledgement is received. For non-voice data, information may be transmitted in a network in packets including TTIs. In some cases, a semi-persistent scheduling aspect will use four copies of TTIs to provide redundancy, but this can result in excess redundancy that decreases the quality of a network, for example. In embodiments, an improved scheduler optimizes the amount of TTI redundancy used for data communications while maintaining voice quality. For example, a system can analyze network traffic and performance and determine that only two redundant TTIs should be transmitted during times of increased voice activity on the network, such as during a morning or evening commute time in a certain city. Because TTI bundling sends a transport block multiple times in consecutive 1-millisecond sub-frames without waiting for an acknowledgement, such as a HARQ ACK/NACK message, more resources than necessary can be consumed, but embodiments herein can designate time frames and/or other settings to reduce the times a transport block is sent. Each TTI can correspond to one subframe, for example a length of 1 millisecond, and transport blocks are transmitted over a radio link, such as the communications shown between a base station 410 and one or more user devices 420.

In some cases, TTIs redundancy will be dynamic, transmitting only one copy of a TTI (and in some cases waiting for an acknowledgement), but increasing the amount of copies of a TTI upon a reduction in voice traffic on the network, or upon a high error rate being detected, for example. By transmitting the fewest amount of redundant TTIs possible while maintaining certain threshold values of network or data quality, the voice traffic or other aspects of the network are improved. As one example, a network scheduler component 432 can determine, based on the overall percentage of data traffic (historically or predicted) or based on the use of resources and/or performance of a network, that for a period of one hour, or until a time of 5:00 PM, for example, only two copies of TTIs will be transmitted prior to an acknowledgement, and/or after a time increment passes without an acknowledgement, one or two more copies of the TTI will be transmitted. In another example, a network scheduler component 432 considers an error rate in a network or an aspect of a network, such as a geographical area or associated with a base station 410, along with the amounts of voice and/or non-voice traffic, to set the redundancy of TTIs for one or more time intervals in a system, in order to avoid unnecessary redundancies of TTIs from being used.

In some embodiments, a scheduling component (such as network scheduler component 432) enables asymmetric FDD operation. For example, embodiments restrict the uplink to use only 20% of the resources and allow an end-user device to use the maximum power allowed, during certain time intervals or until updated, in some cases. According to embodiments, it can be determined that certain hours of the day, for example 5:00-6:00 PM on weekdays, includes an increased demand for power by one or more user devices, such as user device 120, discussed below, or it can be determined that a certain time frame involves higher error rates in the network or other performance issues, such that implementing asymmetrical FDD during that time can improve the performance observed by users of devices such as user device 120.

FIG. 1 illustrates an exemplary environment 100 for implementing one or more embodiments. FIG. 1 shows a base station 110 in communication with one or more user devices 120. The user devices 120 are for purposes of illustration, and any number of user devices 120 can be in communications with one or more base stations, such as base station 110 in FIG. 1, in a network including aspects such as exemplary environment 100. An environment 100 can be, for example, a 4 G LTE network environment or a 5 G network environment, or another type of network. In some cases, environment 100, such as a 4 G LTE network or a GSM system (Global System for Mobile Communications), may use TDD or FDD to transmit and/or receive information such as wireless communications. In some examples, aspects of a network can use TDD while other aspects may implement FDD. The exemplary environment 100 in FIG. 1, as with other illustrative examples described herein, can include one or more other components, for example intermediate device(s) or other components, for example one or more devices in between or as intermediaries between a base station 110 and one or more user devices 120. In some cases, a local cell or hotspot, or a router or signal booster or other component, can be involved in communications between a base station 110 and one or more user devices 120. In embodiments, more than one base station 110 provides communications to the user devices 120, for example based on availability, location, or other configurations of an environment 100.

Turning to FIG. 2, an aspect of an environment 200 is illustrated, which can be used to implement some embodiments of the present invention. The environment 200 in FIG. 2 illustrates a base station 210 and a user device 220 in communication, in this case using TDD. An environment 200 using TDD can include a single channel or transmission path, such as path 230 in FIG. 2, between the base station 210 and the user device 220. As shown, path 230 includes both an uplink portion 232 and a downlink portion 234. The uplink portion 232 and downlink portion 234 are included to show path 230 includes communications in both directions between a base station 210 and a user device 220, and the relative or approximate sizes of the uplink portion 232 and downlink portion 234 are merely illustrative. A path 230 can include many more (or less) uplink portions and downlink portions, such as uplink portion 232 and downlink portion 234, than shown. An environment 200 can be part of a 4 G LTE or 5 G network, for example, or another network such as 3 GPP or a later-generation or local network. As discussed below, a path 230 in an environment 200 can include a series of frames configures as DL/UL slots.

In one example, in a certain area, such as a city or office building, or within a range of one or more towers such as base station 210, it may be determined that an above-average number of devices perform data dump(s) within a certain window of time. Data dumps can be large or bulk transfers of data from one device to another in a system, for example, and may be configured to occur during a time of less traffic or off-hours for various organizations, for instance at approximately 2:00 AM. As described herein, systems may determine certain time(s) of day when voice traffic is more prevalent and/or time(s) of days when data traffic is more prevalent, which can be determined at various scales, such as per base station, or for a set of base stations, or in some cases by zip code or other boundaries. In some cases, certain periods of time can be analyzed, for example based on lower quality of data or voice communication, and/or certain geographic areas can be analyzed, for issues with quality or for associations with certain periods of time. In embodiments, a system can determine one or more aspects of communications with lower quality or other performance metrics. The system can analyze the aspects, such as time and/or areas with lower-quality communications or with high levels of traffic or other conditions, to identify time frames and/or geographic regions where traffic includes an above-average or elevated amount of voice or data communications.

Figure 3:
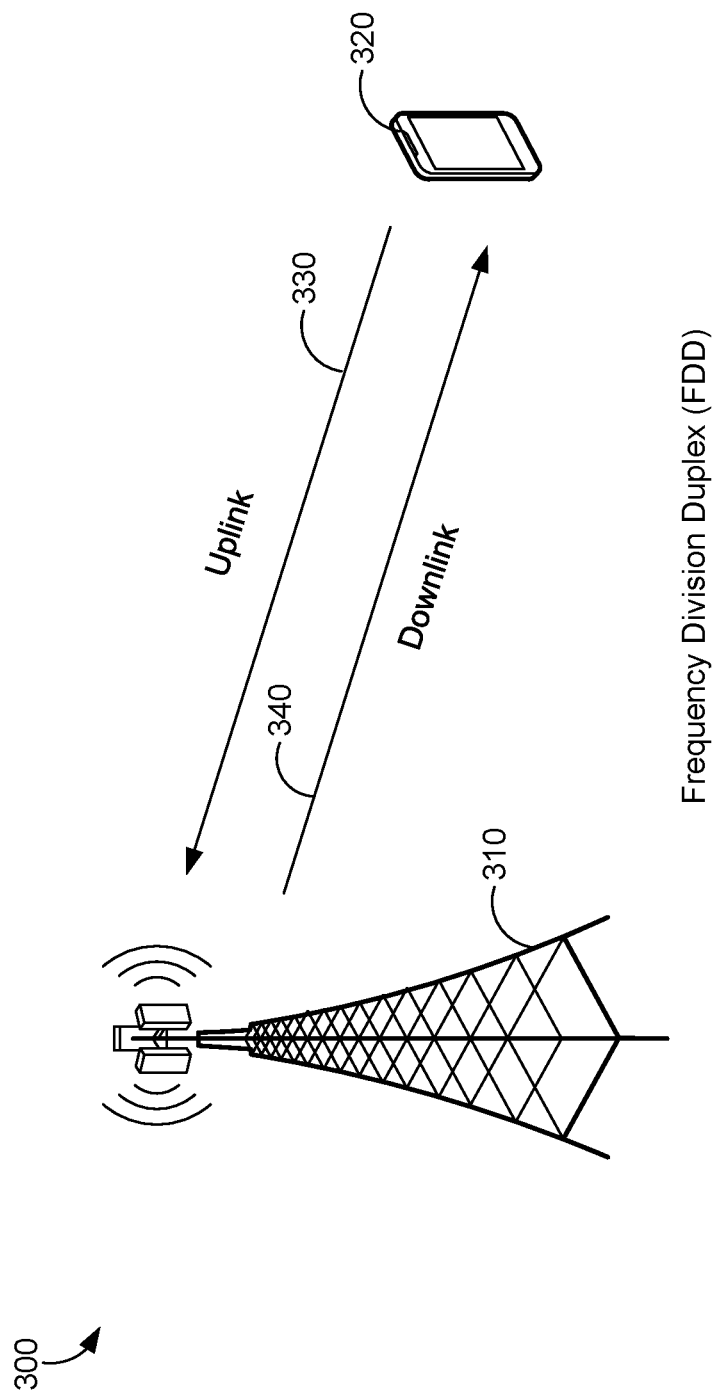
FIG. 3 depicts an aspect of an example network environment suitable for use in implementations of the present disclosure.

FIG. 3 illustrates an aspect of an environment 300, capable of use to implement embodiments in accordance with the disclosure herein. The exemplary aspect of an environment 300 in FIG. 3 is implemented using FDD technology. As illustrated, a base station 310 is in communication with a user device 320, for example directly or through one or more intermediate devices. An uplink path 330 is shown to indicate information transmitted or sent from user device 320 to base station 310, which can include information from a user device 320, for example representing a request to a network from a user device 320, speaking by a user of user device 320 during a phone call, or a photograph being stored to a cloud by a user of user device 320. In some cases, system or device information may be backed up by one or more devices, such as a user device 320, at a certain time of day or within a particular time frame.

The uplink path 330 and downlink path 340 illustrated in FIG. 3 can be comprised of Resource Blocks (RBs). In embodiments of the present invention, a scheduler (such as network scheduler component 432, described below) can schedule time periods where the FDD implementation will be asymmetrical, or in some cases an FDD implementation can be scheduled to by asymmetrical at all times until an update is provided. In some examples, after an analysis of network traffic or user demands on a system, a network scheduler component 432 can identify ranges of time when user devices, such as user device 320 in FIG. 3, can benefit from additional power associated with an uplink, such as uplink path 330. In embodiments, a system can determine that certain hours of day, in a particular city or zip code, the quality of the network traffic or the network performance can be increased by configuring asymmetrical FDD for those hours of the day in that city or zip code. For example, during one or more events in an area, such as a sporting event or work retreat, a network could recognize or predict additional demands for power associated with an uplink by user devices, such as user device 320, and the system can generate scheduling information, discussed below, to configure an FDD environment to be asymmetrical, for certain time periods or until an update. In one example, scheduling information indicates to restrict an uplink path 330 to only use 20% of resources, such as RBs, while the user device 320 is allowed to use the maximum amount of power for uplink actions.

Figure 4:
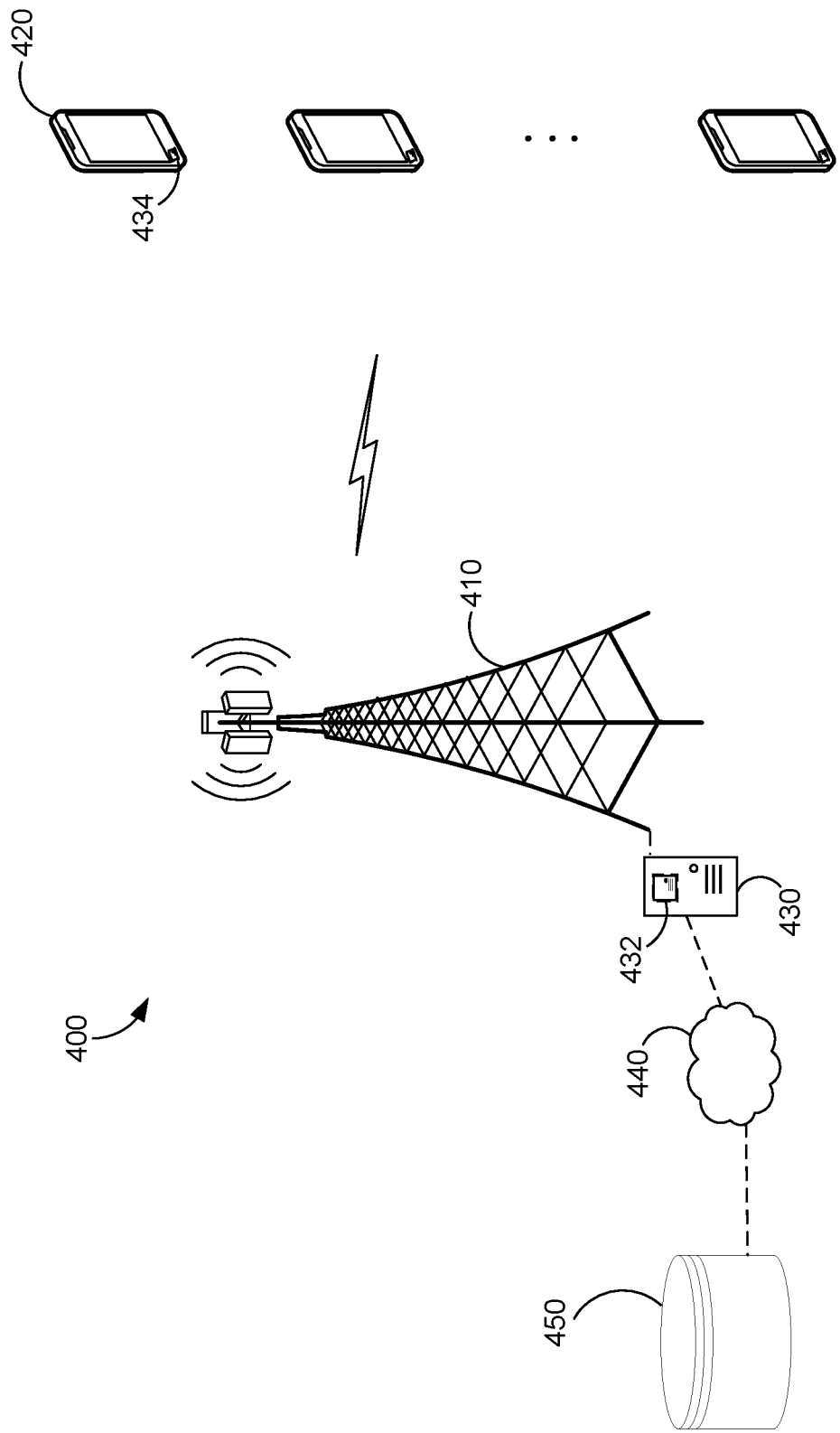
FIG. 4 depicts an aspect of an example network environment suitable for use in implementations of the present disclosure.

FIG. 4 illustrates an aspect of an exemplary environment 400, including a base station 410 in communication with one or more user devices 420, for example communications implemented using TDD or FDD, as discussed above. In embodiments, a computing device 430, such as a server, is associated with or in communication with a base station 410. As shown in FIG. 4, the computing device 430 can include a network scheduler component 432. A system may be determine the rules or other information comprising the network scheduler component 432, in embodiments, based on information determined regarding traffic and/or network(s) and/or rules according to embodiments of the present invention. For example, a network scheduler component can, in some cases, determine certain time periods include either voice traffic over a threshold level, or data traffic over a threshold level, with respect to one or more base stations 410.

In some cases, historical traffic data is analyzed by the system, or one or more methods of predicting traffic can be implemented. For example, a formula based on data from one or more areas can indicate a certain ratio of voice to data traffic to be expected for a second area of a certain size, based on residential, commercial, and/or transportation users or uses of devices likely to occur, for purposes of triggering a particular network scheduler component 432 by the system. In one instance, the network scheduler component 432 may determine that voice traffic for a certain area (for example an area encompassing a set of base stations 410, such as four base stations) is estimated to be over 50% of the total traffic for certain hours of the day, or that voice traffic will average over 50% of the total traffic for certain 15-minute segments. This estimation can be based on historical data (e.g., accessed using data store 450), or models using historical data, or predictive models based on demographics or other data. In another instance, network scheduler component 432 can determine, for a week-long period, certain time periods each day where one or more base stations 410 will likely experience an uptick in voice traffic, for example above a 20% threshold or a 60% threshold, as exemplary values. The network scheduler component 432 can use such information to set the DL/UL ratio, as described herein, and/or to set the TTI bundling parameters to reduce the redundancy of TTI bundles where doing so is likely to cause more increases in performance (due to resources available due to lack of redundancy) compared to any decreases in performance (due to lack of redundancy).

In some cases, a new or updated network scheduler component 432 can be triggered by a system in response to certain quality metrics, such as dropped calls, observed voice data quality and/or frame error rates relating to data transmissions. In embodiments, a demand on the system for more power by one or more user devices, or an identified demand or potential use for increased power by one or more user devices, such as user device 420, can be considered by a system in order to determine the configuration of the network scheduler component 432. A system can receive information, discussed in more detail below, in order to determine rules or configurations for a network scheduler components 432, in embodiments, or the system can receive the rules or configurations. For example, a network scheduler component 432 can use data about a network or predictions about a network, in order to schedule the allocation of slots for uplink or the ration of slots for uplink and downlink, at various time of the day, as discussed in more details below. Or a network scheduler component 432 can cause configuration of the aspect of an environment 400 with respect to the power level associated with a user device 420, for all time periods until an update is received, or for certain hours of the day, when user devices may be experiencing an increased demand. A network scheduler component 432 in the context of FDD can configure which user devices, such as user device 420, are given resources, such as RBs, and how many RBs are to be given to send or receive data, for example. A network scheduler component 432 can indicate scheduling information on a per subframe bases, for example for each millisecond.

FDD implementations in a typical system can use symmetric operations such that a DL allocation of 5 MHz, for example, is equivalent to a UL allocation of 5 MHz, and the amount of RBs assigned to the downlink and uplink can also be equivalent. In embodiments described herein, one or more time frames can be designated by a scheduler, such as network scheduler component 432, to be asymmetrical, including restricting an uplink to use only a percentage of resources, but allowing a user device 420 to use a maximum or increased power level, such as 29 or 31 dBm, for example (a power level in expressed in decibels). Other limits on the percent of resources can be used, in embodiments, with the 20% limit here as an example. For example, a limit of 15% or 35%, or other percentages, can be used by a network scheduler component 432 to configure communications. In some cases, a portion of user devices (e.g., user device 420) can be configured to implement asymmetrical FDD, while another portion of the devices associated with an area, such as a base tower 410 coverage area, are not configured to use asymmetrical FDD.

Continuing with FIG. 4, a user-device scheduler component 434 is shown in association with user device 420. In some cases, a user-device scheduler component 434 is received at a user device 420 simultaneously with a computing device 430 receiving a network scheduler component 432, for example when the network scheduler component 432 determines based on traffic data or a configuration to generate scheduling information. As one example, a network scheduler component 432 receives information that triggers an update or new scheduling information, in order to optimize the quality of the voice and/or data traffic for certain times, or the available power for use by a user device 420. Then, in this example, the network scheduler component 432 transmits the user-device scheduler component 434 to one or more user devices, which can be transmitted directly after directly after it is determined or received by a network scheduler component 432, or at a predetermined time, or when each of the one or more user devices 420 is within a range of a base station 410. In some cases, a network scheduler component 432 may regularly or periodically be synchronized with one or more user-device scheduler component(s) 434 associated with one or more user device(s) 420. A user-device scheduler component 434 can be automatically pushed to a user device 420, or requested by a user device 420 as part of accessing or being recognized by an aspect of a network.

FIG. 4 further illustrates one or more network components 440 in communication with base station 410 and/or computing device 430, for example additional base stations or other components, such as access points, tunneling points, links, or other routing or network devices. In some cases, one or more network components 440 is between a computing device 430 and a base station 410. It should be understood that aspects of environments, such as environment 400, and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Additionally, many of the elements described herein may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory, for example computing device 430. It should be understood that the operating environments shown in the Figures are examples of suitable operating environments.

Also shown in the example in FIG. 4 is a data store 450, which can be in communication with a computing device 430. In some cases, computing device 430 is directly connected to or part of base station 410. Data store 450 can include information about network traffic, for example historical information such as traffic data over a one-month or other time period. One or more databases such as data store 450 can provide information about an area and/or a time frame to a computing device 430 for purposes of generating a network scheduler component 432 and a user-device scheduler component 434. In one example, the network scheduler component 432 requests traffic information for base station 410 (or for a set of base stations over within a boundary) for a twenty-four hour period (for example, for a prior Monday), then the network scheduler component 432 uses this information to determine a schedule, which is transmitted to a user-device scheduler component 434. In some embodiments, the user device 420 includes or comports with settings or other configurations and the user-device scheduler component comprises a portion of the settings or other configurations. For example, a network scheduler component 432 can determine certain hours of the day with higher voice traffic relative to an expected or average, or threshold, amount of voice traffic, or relative to an amount of data traffic, for the city that includes base station 410, then the system including the network scheduler component 432 configures base station 410, during the identified hours, to use a particular ration of slots for DL/UL in a TDD implementation, for example a 3:2 split, which is more symmetrical and thus can provide higher quality voice communications.

A data store 450 can be distributed among more than one database or component, or in some cases data store 450 can be part of a computing device 430. Data store 450 and/or computing device 430 store computer instructions (e.g., software program instructions, routines, or services), data, and/or models used in embodiments described herein. In some implementations, data store 450 stores information or data received via the various components of a system and provides the components with access to that information or data, as needed. In some embodiments, a computing device 430 is located at a base station 410 and communicates with one or more data stores such as data store 450 to receive information for determining, for example, a network scheduler component 432.

In embodiments, a system, for example a system including an aspect of an exemplary environment 400, analyzes network traffic for a specific area, for example an area defined by square-mileage that includes base station 410. In some cases, traffic over a period of days or weeks is analyzed in order to determine one or more hours of a day or other time increments during which to adjust settings in the system, such as the ratio of DL/UL slots, the amount of redundancy of TTIs used by the system, or any limits on resources used in an uplink to provide increased or maximum power to be used by one or more user devices, such as user device 420. Based on information about traffic, for example as stored in data store 450, the system can automatically trigger scheduling information for use by the system, in order to improve voice and/or data quality in a network. In some cases, a network scheduler component 432 and/or user-device scheduler component 434 are smart schedulers, which can be configured or set at the base station 410 (for example at a directly-connected computing device 430 or other component) or at a user device 420. In embodiments, the scheduler components such as a network scheduler component 432 and/or user-device scheduler component 434 represent a protocol or setting understood between a user device 420 and a network and/or base station 410 for communicating.

In an example, data store 450 can include snapshots of the ratios of voice and data traffic, or snapshots of demands for power or shortfalls in demand for power, and a computing device 430 can use the traffic data to generate network scheduler component 432 and/or user-device scheduler component 434. In one example, snapshot values of network traffic, or averages, such as hourly averages, can be analyzed by the computing device 430, and time frames with voice traffic or other demands over a threshold amount are designated for dynamically-adjusted configurations to be scheduled. For instance, one week of traffic can show values for certain demands, such as voice data, above a threshold for four time points a day during the five weekdays, but not values above the threshold on weekends. This could be due, for example, to a reduced amount of commuters on weekends using voice calls while driving, or less users in an area on the weekend due to office space. In response, the system can automatically generate a network scheduler component 432 dictating use of a 3:2 DL/UL split during the four time points a day during the five weekdays, to improve voice communications by implementing a more symmetrical use of a DL/UL path during higher voice-traffic times. In embodiments, the time points identified as below a threshold for voice traffic correspond to times where certain systems perform data dumps or other transfers or uses of a network that do not comprise voice traffic. In another example, yearly data or other information from one or more data sources, such as data store 450, can be used by the system to determine or predict variations, such as holidays or scheduled upgrades that can impact the traffic. The determinations or predictions can be used to generate scheduling information for a network, for example network scheduler component 432 and/or user-device scheduler component 434.

Figure 5:
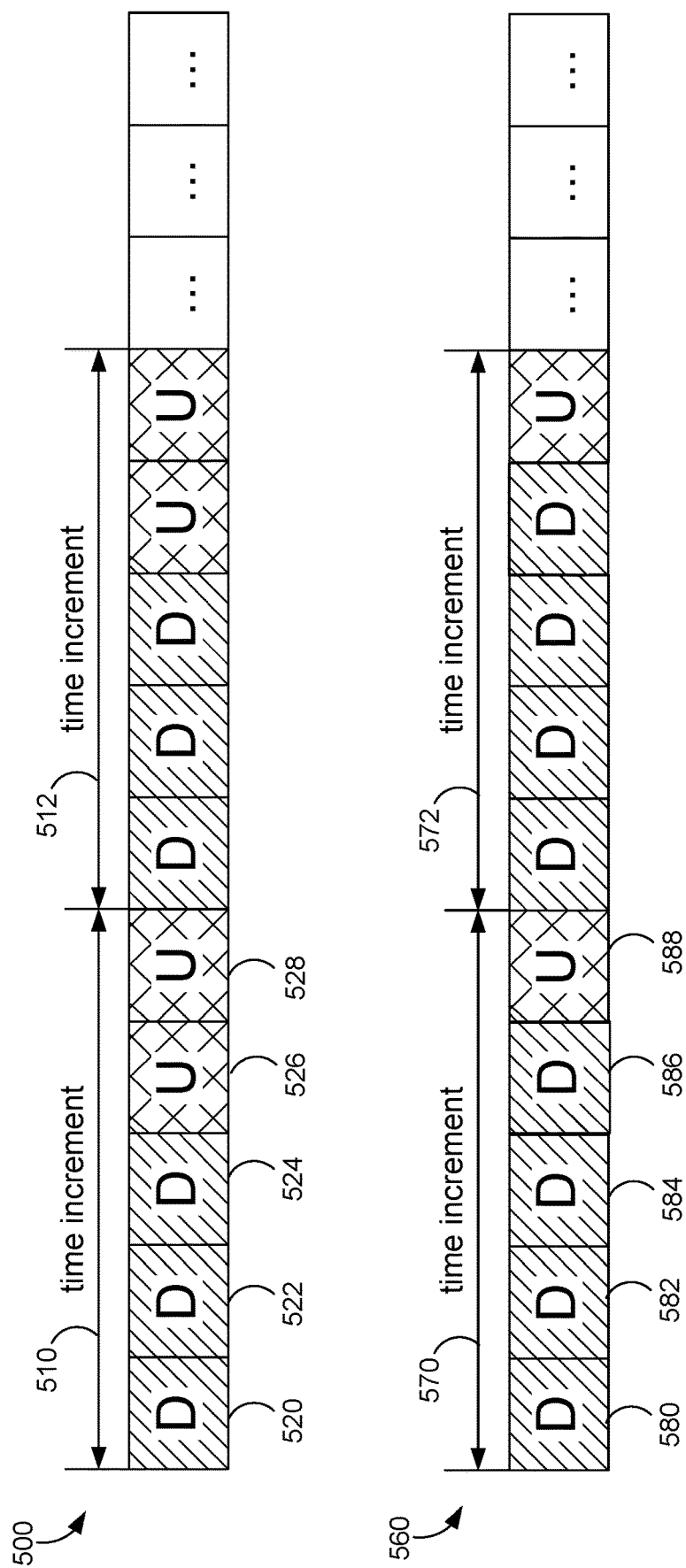
FIG. 5 depicts a diagram of an exemplary slot assignment in accordance with aspects of embodiments suitable for use in implementations of the present disclosure.

Turning to FIG. 5, an exemplary slot assignment 500 is shown in accordance with aspects of embodiments. For uses relating to TDD implementation, a single frequency band (indicated by path 230 in FIG. 2) can be used to both transmit and receive information. The band can be shared by assigning alternating slots to the transmitting and receiving operations, such as uplink slots and downlink slots. Information being transmitted, whether voice or data traffic, is in a serial binary format, and each slot can comprise one byte or a frame of more than bytes. The exemplary slot assignment 500 is illustrated as including a first time increment 510 and a second time increment 512. In some cases, each time increment may be referred to as a frame, and the assignment of uplink and/or downlink slots may be referred to as the frame configuration. In the example shown in slot assignment 500, a frame configuration with a ratio of 3:2 is demonstrated, because each time increment such as the first time increment 510 includes first downlink-assigned slots 520, 522, 524 (three total per frame) and first uplink-assigned slots 526, 528 (two total per frame). Thus each frame includes a 3:2 ratio of first downlink-assigned slots 520, 522, 524 and first uplink-assigned slots 526, 528. In some cases, this 3:2 ratio can be implemented by a network scheduler component 432 during peak or increased periods of voice traffic in a network or associated with one or more base stations, such as base station 410. As one example, a path such as path 230 in FIG. 2, implemented using TDD, can include a slot assignment 500 between a user device 220 and a base station 210 along the path 230. The network scheduler component 432 can be used by a system to determine that a slot assignment 500 with a 3:2 ration is to be used during certain time frames of increased voice traffic, to improve the quality of communications during the time frames (for example, during a rush hour when an increased number of people may make calls instead of using data information).

Also shown in FIG. 5 is a second slot assignment 560. The second slot assignment 560 includes a third time increment 570 and a fourth time increment 572. With respect to the third time increment 570, second downlink-assigned slots 580, 582, 584, 586 (each indicated by a "D") and second uplink-assigned slot 588 are shown, which can correspond to a 4:1 ratio of DL/UL slots for each frame or time increment 570. In embodiments, the second slot assignment 560 can represent the frame configuration during times of predominantly data usage, for example in order to provide a less symmetric configuration. This second slot assignment 560, with more slots dedicated to downlink, such as the 4:1 ratio, can improve the quality of traffic on a network when relatively more data transfers, and/or relatively less voice traffic, is being used. For example, during discrete times of day in an area including one or more base stations, such as base station 110, the DL/UL ratio can be configured to switch from a 3:2 ratio to a 4:1 ratio, and vice versa, for example to accommodate times of day with likely data dumps or other traffic.

Figure 6:
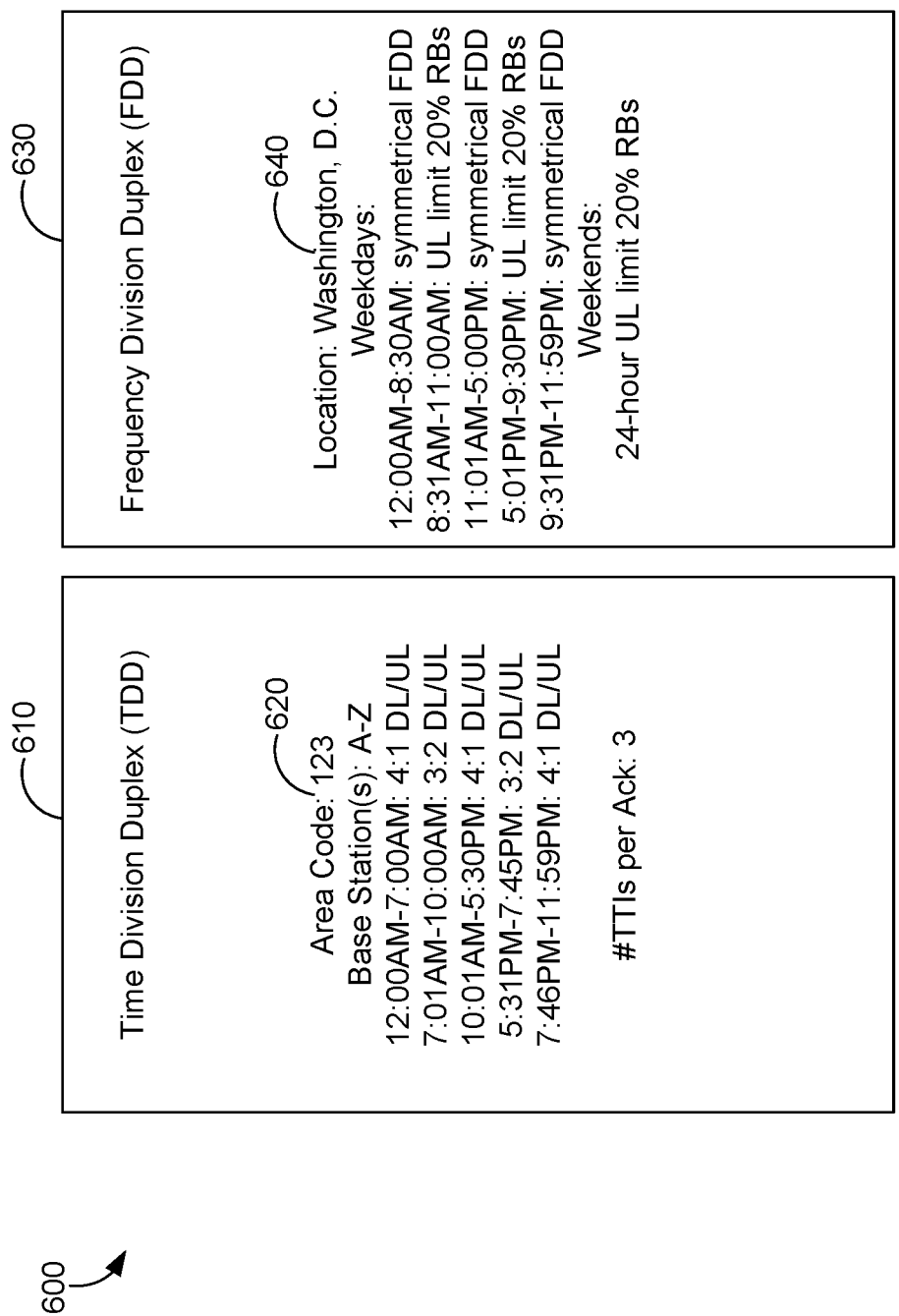
FIG. 6 depicts illustrative information suitable for use in implementations of the present disclosure.

FIG. 6 illustrates exemplary TDD information 610 that can be determined and/or conveyed by a network scheduler component 432, for example to a user-device scheduler component 434. The TDD information 610 in FIG. 6 is only illustrative, showing, for example, a TDD configuration 620 for one or more devices in a TDD setting. The TDD configuration 620 can optionally indicate to a system a particular area, one or more base stations, and certain time frames and frame configurations, for example the indication of a 4:1 DL/UL ratio for the time frame 12:00 AM to 7:00 AM. In some cases, TDD configuration 620 can designate a number of TTIs to be transmitted, for example the rate of redundancy of TTIs to be used, in some cases per an acknowledgement. In embodiments, a number of TTIs is configured for various time frames (as illustrated for the DL/UL ratios in TDD configuration 620). For example, a TTI can represent 1 millisecond of time. A system can determine, using information from a data store 450, for example, that a particular number or redundancy of TTI transmissions should occur, in some cases prior to an acknowledgement. In embodiments, a number of TTI transmissions to occur, for example the rate of redundancy of TTI transmissions, can be scheduled to vary during a day or other time period, similar to the time increments shown for the DL/UL ratios within TDD information 610 in FIG. 6.

In embodiments, FDD information 630 is included in scheduling information, for example as determined and/or transmitted by a network scheduler component 432 and can include FDD configuration 640, which can include, at times or during all times until further information received, a limit on UL resources, for example at 20%, which can provide or allow a user device 420 to use a maximum or increased power level (for example above the 5 MHz or another amount that may be used in a symmetrical implementation). An FDD configuration 640 can also include information setting the amount of TTI redundancy to be used, either overall or for certain time increments. The rate of TTI redundancy can be configured by a system, or in some cases a rate or amount of TTI redundancy prior to an acknowledgement is configured by a system, for example as determined or transmitted by a network scheduler component 432.

Figure 7:
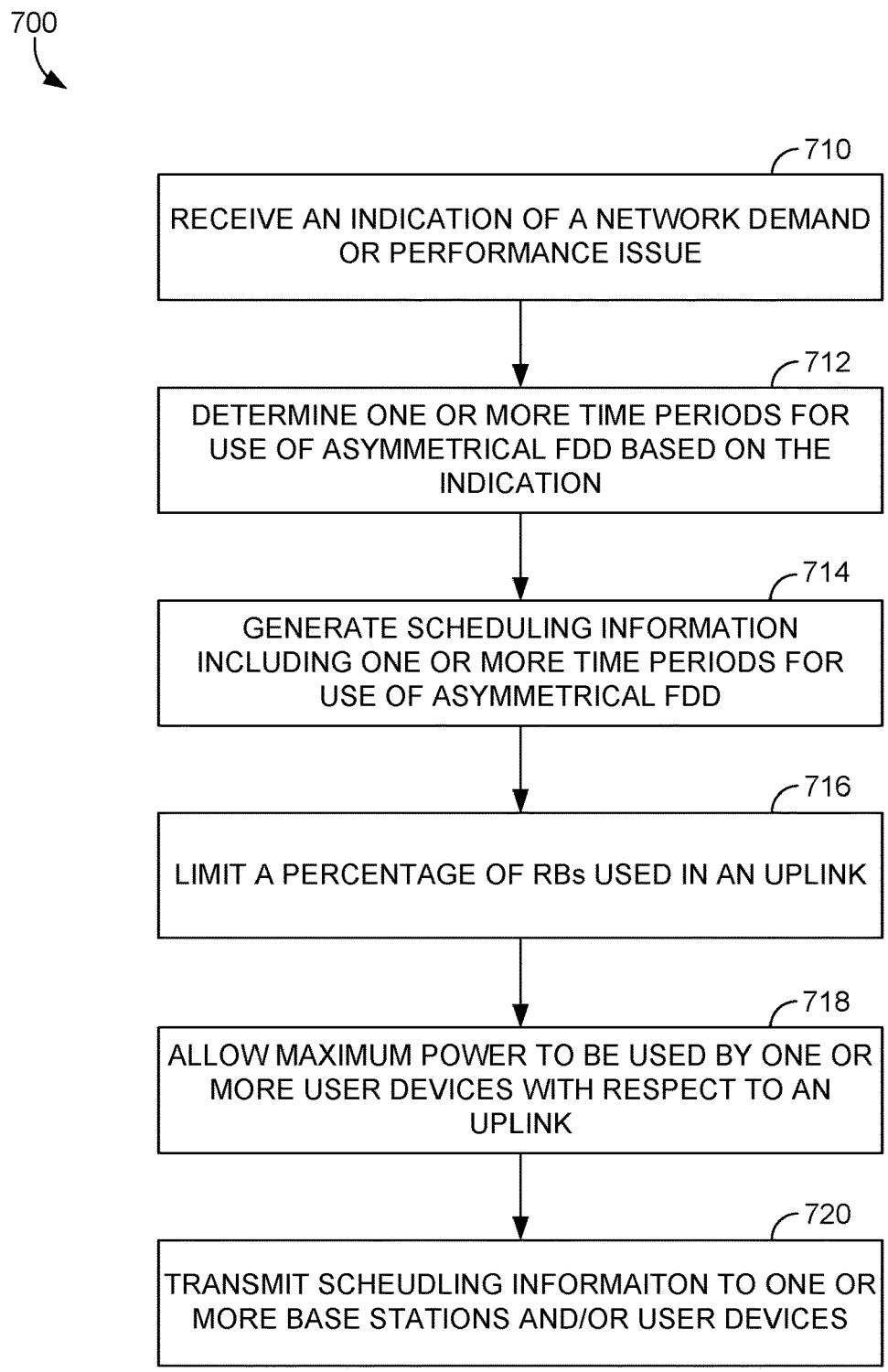
FIG. 7 depicts a flow diagram showing exemplary processes associated with aspects of embodiments suitable for use in implementations of the present disclosure.

FIG. 7 depicts a flow diagram 700 showing exemplary processes associated with aspects of embodiments suitable for use in implementations of the present disclosure. At 710, an indication of a network demand, such as user devices demanding more power or an increase in errors or other issues due to a lack of power to meet a demand, is received, for example at computing device 430. At 712, it is determined if one or more time periods would benefit from use of asymmetrical FDD based on the indication, for example, At 714, scheduling information is generated, and at 716, a percentage of resource blocks used in an uplink is limited to a percentage, for example 20%. At 718, maximum power is enabled for one or more user devices, for example by the scheduled configuration, and at 720 scheduling information is transmitted to one or more base stations, such as base station 110, and/or to one or more user devices, such as user device 120.

Figure 8:
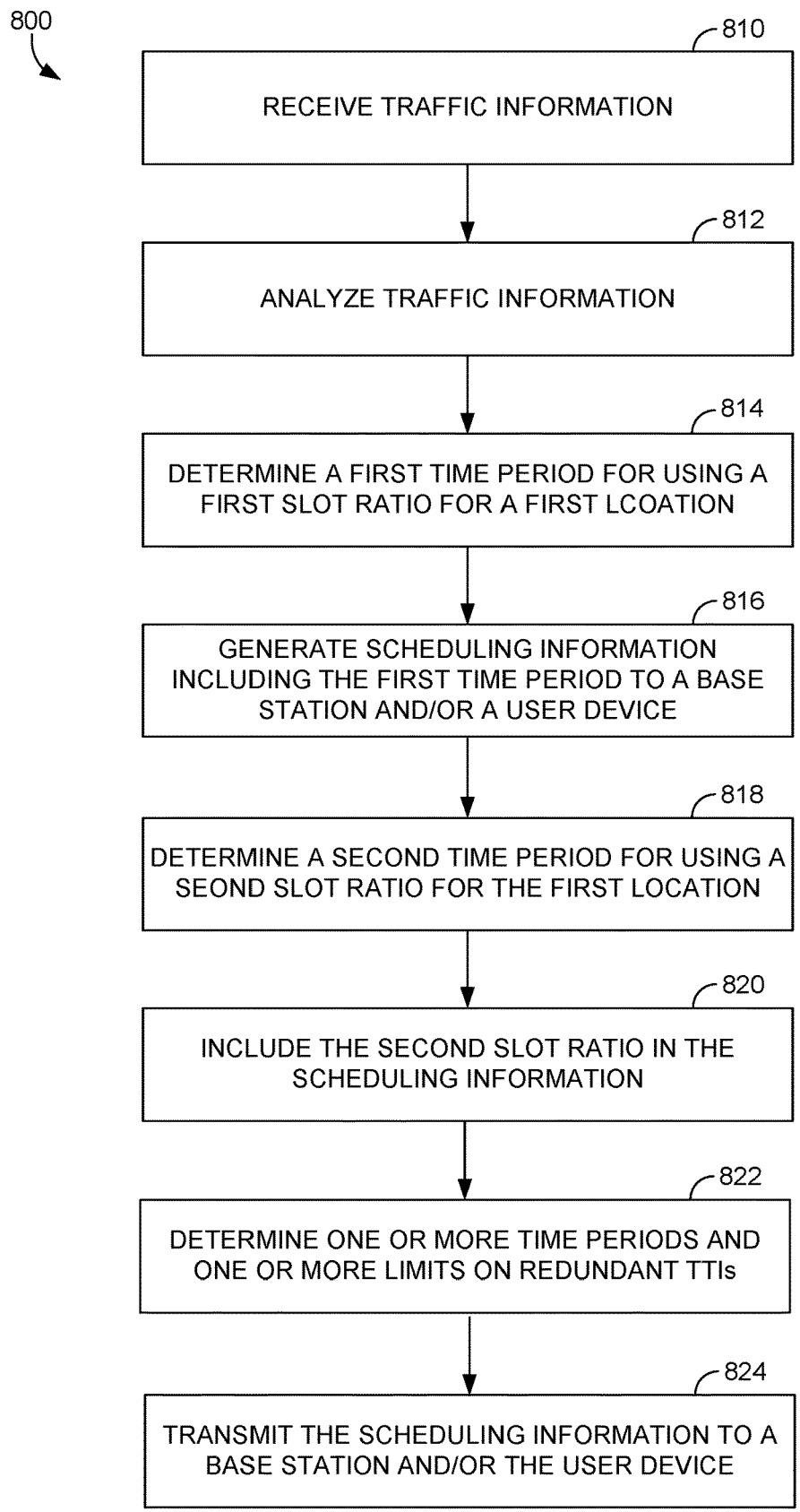
FIG. 8 depicts a flow diagram showing exemplary processes associated with aspects of embodiments suitable for use in implementations of the present disclosure.

FIG. 8 depicts a flow diagram 800 showing exemplary processes associated with aspects of embodiments suitable for use in implementations of the present disclosure. As shown in FIG. 8, at 810, traffic information is received. At 812, traffic information is analyzed, for example by a computing device 430 and/or a network scheduler component 432. At 814, a first time period for using a first slot ratio is determined, and at 816, scheduling information is generated. At 818, a second time period for using a second slot ratio for the first location is determined, and at 820, the second slot ration is included in the scheduling information. As shown at 822, one or more time periods for use of one or more limits on redundant TTIs is determined, which can also be included in scheduling information. At 824 the scheduling information is transmitted to a base station, such as base station 110, and/or to a user device, such as user device 120.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for scheduling resources in a network, the method comprising:
 receiving traffic information associated with a location, wherein the traffic information includes voice traffic above a threshold amount;
 analyzing the traffic information to determine a first time period to be scheduled as using a first slot ratio; and
 transmitting first scheduling information indicating the first time period as using the first slot ratio, wherein the first scheduling information includes an amount of redundant Transmission Time Intervals (TTIs) to be used.

2. The method of claim 1, wherein the threshold amount is a percentage of voice traffic.

3. The method of claim 1, wherein the first time period is an hour.

4. The method of claim 1, further comprising:
 analyzing the traffic information to determine a second time period to be scheduled as using a second slot ratio, wherein transmitting the first scheduling information includes indicating the second time period as using the second slot ratio.

5. The method of claim 1, wherein the second time period is associated with one or more data transfer actions.

6. The method of claim 1, wherein the location is a coverage area of a base tower.

7. A system for scheduling resources in a network, the system comprising:
receiving traffic information associated with a location, wherein the traffic information includes voice traffic above a threshold amount;
analyzing the traffic information to determine a first time period to be scheduled as using a first slot ratio; and
transmitting first scheduling information indicating the first time period as using the first slot ratio, wherein the first scheduling information includes an amount of redundant Transmission Time Intervals (TTIs) to be used.

8. The system of claim 7, wherein the threshold amount is a percentage of voice traffic.

9. The system of claim 7, wherein the first time period is an hour.

10. The system of claim 7, further comprising:
analyzing the traffic information to determine a second time period to be scheduled as using a second slot ratio, wherein transmitting the first scheduling information includes indicating the second time period as using the second slot ratio.

11. The system of claim 7, wherein the second time period is associated with one or more data transfer actions.

12. The system of claim 7, wherein the location is a coverage area of a base tower.

13. The system of claim 7, wherein the threshold amount is an average level.

14. One or more non-transitory computer-readable media having computer-executable instructions embodied thereon that, when executed, perform a method for scheduling resources in a network, the method comprising:
receiving traffic information associated with a location, wherein the traffic information includes voice traffic above a threshold amount;
analyzing the traffic information to determine a first time period to be scheduled as using a first slot ratio; and
transmitting first scheduling information indicating the first time period as using the first slot ratio, wherein the first scheduling information includes an amount of redundant Transmission Time Intervals (TTIs) to be used.

15. The media of claim 14, wherein the threshold amount is a percentage of voice traffic.

16. The media of claim 14, wherein the first time period is an hour.

17. The media of claim 14, further comprising:
analyzing the traffic information to determine a second time period to be scheduled as using a second slot ratio, wherein transmitting the first scheduling information includes indicating the second time period as using the second slot ratio.

18. The media of claim 14, wherein the first slot ration is a 3:2 ratio.

* * * * *